United States Patent

[11] 3,618,028

[72] Inventors Allen M. Johnson
Endicott;
Loyal D. Youngblood, Apalachin, both of N.Y.

[21] Appl. No. 29,898
[22] Filed Apr. 20, 1970
[45] Patented Nov. 2, 1971
[73] Assignee International Business Machines Corporation
Armonk, N.Y.

[54] LOCAL STORAGE FACILITY
9 Claims, 1 Drawing Fig.

[52] U.S. Cl. .......... 340/172.5
[51] Int. Cl. .......... G06f 11/00
[50] Field of Search .......... 340/172.5

[56] References Cited

UNITED STATES PATENTS

| | | | |
|---|---|---|---|
| 3,252,149 | 5/1966 | Weida et al. | 340/172.5 |
| 3,303,474 | 2/1967 | Moore et al. | 340/172.5 |
| 3,409,879 | 11/1968 | Keister | 340/172.5 |
| 3,444,528 | 5/1969 | Lovell et al. | 340/172.5 |

*Primary Examiner*—Gareth D. Shaw
*Attorneys*—Hanifin and Jancin and Robert W. Berray ABSTRACT: A microdiagnostic processing system is combined in a computer system with a main storage memory for control and data words of bits and for providing signals indicative thereof, a control register connected to receive the signals indicative of control words and to execute the same, a processing unit for performing logical operations on signals indicative of such words and two local storage units for receiving, storing, and transmitting signals indicative of such words and connected to receive such signals from the main storage memory and from the processing unit and to transmit such signals to the main storage memory and the processing unit. The microdiagnostic system includes a local file providing a stored program of signals indicative of control and data words and connected to supply the signals to the control register and the local storage units and inhibit means under the control of the control register for disabling one only of the two local storage units from receiving signals for storage, so that different sets of signals may be selectively stored in the two local storage units.

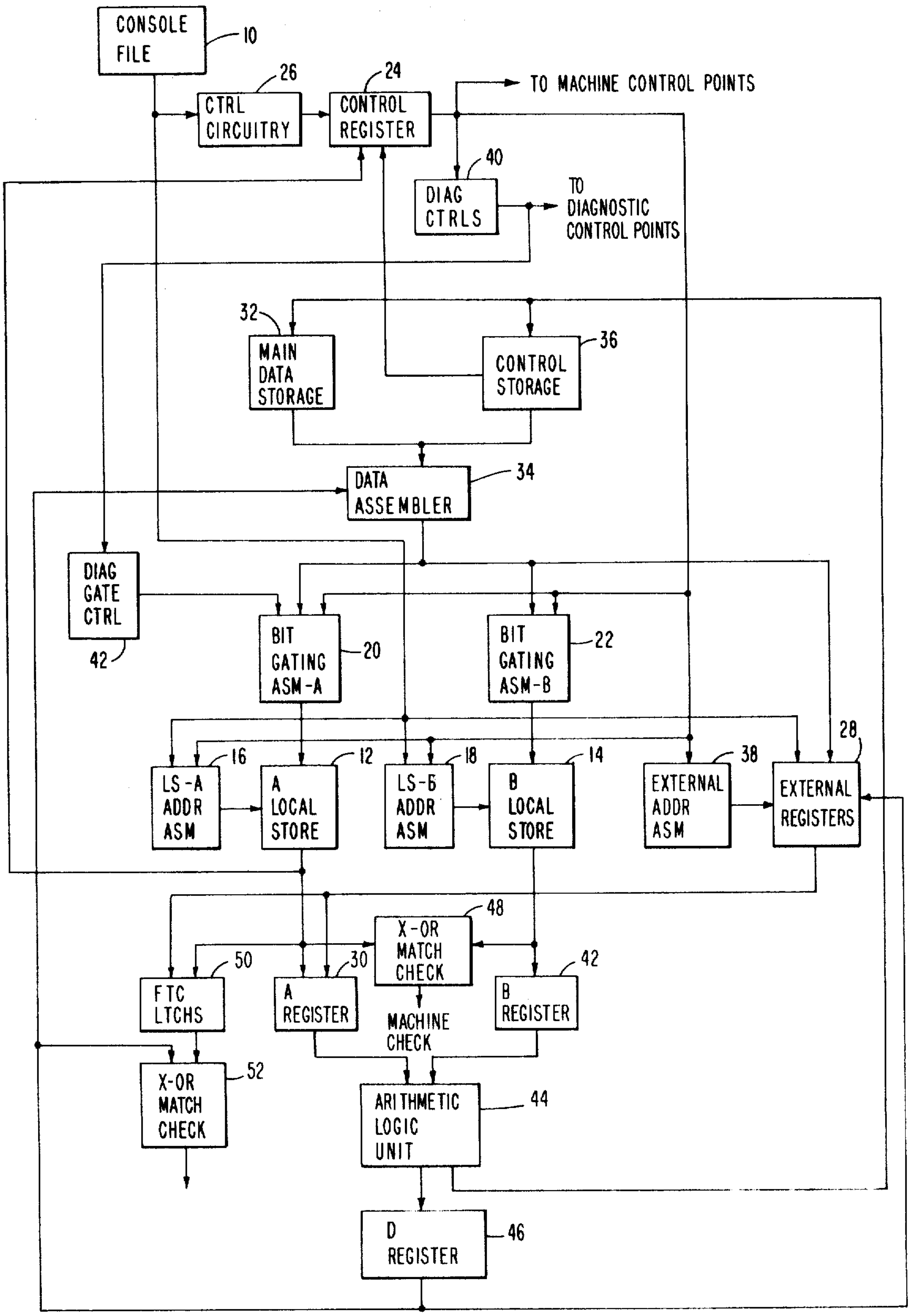
CONSOLE FILE
10
CTRL CIRCUITRY
26
CONTROL REGISTER
24
TO MACHINE CONTROL POINTS
DIAG CTRLS
40
TO DIAGNOSTIC CONTROL POINTS
MAIN DATA STORAGE
32
CONTROL STORAGE
36
DATA ASSEMBLER
34
DIAG GATE CTRL
42
BIT GATING ASM-A
20
BIT GATING ASM-B
22
LS-A ADDR ASM
16
A LOCAL STORE
12
LS-B ADDR ASM
18
B LOCAL STORE
14
EXTERNAL ADDR ASM
38
EXTERNAL REGISTERS
28
X-OR MATCH CHECK
48
FTC LTCHS
50
A REGISTER
30
B REGISTER
42
MACHINE CHECK
X-OR MATCH CHECK
52
ARITHMETIC LOGIC UNIT
44
D REGISTER
46

LOCAL STORAGE FACILITY

This invention relates generally to computer processing units having a plurality of local storage units for words of information bits in addition to a local read file for microprograms which includes microdiagnostics and in particular to novel and improved apparatus for increasing the speed and quality of self-diagnosis in processing units of the type described above.

Existing computer processing units frequently employ local storage units in order to reduce the length of transmission lines and, therefore, to reduce word transmission time between storage and a processing unit such as an arithmetic logic unit (ALU) which performs logical operations on the data. Such local storage units may provide duplicate storage to further increase processing speed where duplicate words may be simultaneously processed by permitting twice as many data or control words to be read out simultaneously into the arithmetic logic unit as is possible with a single local storage unit.

However, even though duplicate local storage increases the processing speed in such cases, it has a number of drawbacks. The requirement that storage be in duplicate necessarily limits the capacity of the local units for different information to one half of the storage space available. Furthermore, there are times in diagnostic testing when nonduplicate storage would be preferable, for example, when it is desired to compare actual results (e.g., ALU processing) with expected results.

The object of the present invention is to preserve the advantages of duplicate local storage in such computing apparatus while at the same time overcoming the disadvantages thereof, by simple modification of the circuitry thereof.

The invention features the combination with a computer having such duplicate local storage units and means, preferably a local file, for supplying control and data words to the computer, including the local storage units, of a microdiagnostic program, and of additional circuitry under the control of the program for selectively inhibiting one only of the units from receiving information bit words from the duplicate source thereof. In this way it is possible without major circuitry modification, by suitable manipulation of the inhibit circuitry, to store different information in the two units such as an expected results table in one unit and actual results of data processing in the other, with the outputs compared in parallel for accuracy, in comparison circuitry, without using the arithmetic comparison units of the ALU, particularly where ALU is not capable of comparing the parity or check bits. Also, by means of the invention, it becomes possible to provide a "protected area" for storage of a program of control words to which the control register of the computer has comparatively fast access without effectively reducing the working area for the results of data processing in diagnostic operations where duplicate storage is not necessary, by storing the control words and results in the two storage units respectively. An additional advantage is that comparison circuitry provided for comparing the outputs of the two local storage units with each other and/or with the inputs thereto may itself be checked for accuracy without the addition of any further circuitry.

Other objects, features and advantages will become apparent from the following description of a preferred embodiment of the invention, taken together with the attached drawing thereof, in which:

The FIGURE is a block diagram of a portion of a processing unit constructed in accordance with the invention.

Referring to the FIGURE, there is shown a portion of a microprogrammed processing unit having a console file 10 which may for example be a local read only disk file, having microdiagnostic programs stored therein, and two local stores, A-local store 12 and B-local store 14, each having a 64-word capacity. A and B-local stores 12 and 14 have address assemblers 16 and 18, respectively, arranged to receive address information from console file 10 and to designate the location of data read into and out of A-local store 12 and B-local store 14, and bit gating assemblers 20 and 22, respectively, arranged to gate data into A- and B-local stores 12 and 14. Console file 10 is arranged to gate address information bits to A and B address assemblers 16 and 18, control words to control register 24 via control circuitry 26 and control words and data words to the external registers 28. External registers 28 are arranged to transmit data words to A register 30. The main memory of the unit has a main data storage 32, arranged to transfer data words to the data assembler 34, and a control storage 36, arranged to transfer control words both to control register 24 when file 10 is not in control, or the data assembler 34. Control register 24 is arranged to decode control words and transfer control signals to the machine control points, to bit gating assembling circuits 20 and 22, to A and B-local store address assemblers 16 and 18, to external address assembler 38, and to diagnostic controls 40, which are arranged to enable microprograms to be used for providing diagnostic controls in the processing unit and in main data storage 32 and control storage 36. Diagnostic controls 40 are arranged to transfer a gating control signal to diagnostic gate control 42 which controls a plurality of AND gates and is arranged to permit bit gating assembling circuit 20 to gate bits to A-local store 12 when the gating control bit in diagnostic controls 40 is a "0" or, alternatively, to inhibit the gating of bit gating assembling circuit 20 and to block data from A-local store 12, when the gating control bit in diagnostic controls 40 is a "1."

A-local store 12 and B-local store 14 have, respectively, A-register 30 and B-register 42 which are arranged, respectively, to transfer full words of information simultaneously from A and B-local stores 12 and 14 to the arithmetic logic unit 44. A-local store is further arranged to transfer control words to control register 24. Arithmetic logic unit (ALU) 44 is arranged to transfer information to main data and control storages 32 and 36.

ALU 44 is arranged to perform a plurality of well-known logical operations on data flowing in the main data stream and to transfer the data to D-register 46 which in turn reads out (via data assembler 34) the data or results after the data has been operated upon by ALU 44, into A-local store 12 and into B-local store 14 in duplicate when bit gating assembling circuit 20 is not inhibited by gate control 42 or into the external register 28. D-register 46 is further designed to retain on its output terminals the information read out therefrom until the information is released.

A-local store 12 and B-local store 14 both have a "write" cycle in which data that is destined to A and B-local stores 12 and 14 is automatically read out for comparison in EXCLUSIVE-OR (X-OR) match check circuitry 48. X-OR match check circuitry 48, including 36 EXCLUSIVE-OR gates, is arranged, when desired, to compare in parallel the information destined to B-local store 14 (an "A/B compare check") on a 36-bit word basis and, if the information does not compare, to initiate a conventional machine check. In addition, flush through check latches 50 are provided to store the information read out from A-local store 12 in the "destination" cycle. X-OR match check circuitry 52 compares in parallel information which is destined to A-local store 12 in latches 50 with the corresponding information stored on the output terminals of D-register 46 and to initiate a "flush through" check—i.e., a check of the circuitry reading data out of D-register 46 into A-local store 12 and of the "destination" circuitry—if the data does not compare.

After console file 10 has transferred control to the processor, control words are transferred from control storage 36 to control register 24. When console file 10 has control, control words are transferred from console file 10 to control register 24 by control circuitry 26. Data words are transferred from console file 10 to local storage 12 and 14 through external registers 28, A-register 30, ALU 44, D-register 46, data assembler 34 and A and B-bit gating assembling circuits 20 and 22. Console file 10 also gates control signals to A and B-local storage address assemblers 16 and 18. Initially the control information and data bits pass unchanged through an external register 28, A-register 30, and ALU 44 and enter D-register 46 which transfers the information to A and B-local stores 12 and 14 in duplicate in the location determined by the control signals to address registers 16 and 18, respectively. When the data enters A and B-local stores 12 and 14, it is also read out for comparison by X-OR match check circuitry 48 for an A/B compare check. Comparison of the data on a 36-bit basis permits four bytes, each including 8 data bits and one parity check bit, to be checked simultaneously. When the destination operation occurs, the data read out of A-local store 12 is also stored in "flush through" check latches 50 and compared with the information, which was intended to be transmitted and which remains on the output terminals of D-register 46, by X-OR match check circuitry 52.

A-register 30 transfers information out of A-local store 12, and B-register 42 transfers information out of B-local store 14 and the data enters the ALU 44 which performs operations on the data as determined by the particular control word in the control register 24. Since both A and B-local stores 12 and 14 may be addressed in the same control word, the speed with which the data may be processed is considerably greater than that in machines which employ only one local storage unit.

ALU 44 transfers the information upon which it has operated and/or results of the operations to D register 46 which reads the information into the external registers 28 or A and B-local stores 12 and 14 in duplicate. If the information is read in the local stores 12 and 14, then the X-OR match checks are performed by circuitry 48 and 52.

When the gating control bit from diagnostic controls 40 is "1," gating of data into A-local store 12 is inhibited by gate control 42 and data is transferred from D-register 46 to B-local store 14 only. Thus, information may be transferred into B-local store 14 which is different from that stored in A-local store 12. novel feature of the invention provides both simplification of several functions of existing processing units and the implementation of new functions without requiring bulky and/or expensive additional hardware.

For example, control words first may be read into A and B-local stores 12 and 14 in duplicate and A-local store 12 then disabled from receiving further information. The control words are then replaced in B-local store 14 by microdiagnostic data bit words read into B-local store 14. At this point readout from A local store 12 and the operations of ALU 44 may be initiated by transferring control words from console file 10 or control storage 36 to control register 24 which in turn establishes the machine operations (not shown) necessary to initiate the transfer of control words from A-local store 12 to control register 24. Thus, a working area B-local store 14 is provided for data of 64 words for microdiagnostics, while the control words are stored in a separate "protected" control area. Each control word may be read out of A-local store 12 into control register 24 and executed in approximately 200 nanoseconds and may be accessed in A local store and processed nonsequentially. Furthermore, as is conventional in microprogram processing each control word which is transferred to control register 24 identifies the next control word which is to be read out from A-local store 12 to control register 24. Thus, the "protected" control storage and readout from A-local store 12 substantially increases the speed with which the control words may be processed since the time required for transfer of successive control words to be processed from console file 10 to control register 24 is of the order of 300 microseconds. Execution from local store is necessary prior to the validation of operation from control storage. All tests concerned with testing control storage 36 are executed from local storage 12. X A table of expected results may be read into A and B-local stores 12 and 14 from console file 10, and gating into A-local store 12 may then be inhibited. Actual results from the operations of the ALU 44 are read into B-local store 14 and compared with the expected results by X-OR match check circuitry 48. Thus, the necessity of checking results by means of the arithmetic comparison circuitry of ALU 44, which has heretofore been the case, is obviated, while the working area for the data bits is not reduced below 64 words. Furthermore, parity check bits as well as data bits are checked.

An important new function provided by the invention is the checking of X-OR match check circuitry 48 and the flush through check circuitry, including latches 50 and X-OR match check circuitry 52. In order to check X-OR match check circuitry 44, data is transferred into A and B-local stores 12 and 14 in duplicate, gating into A-local store 12 is inhibited, and the data in B-local store 14 is replaced by different data read into B-local store 14. As a result of this operation, the X-OR match check circuitry 48, if operating properly, will indicate a noncompare.

Similarly, to check the flush through circuits, new data is read into local store with the entry to A local store 12 inhibited such that the old data is stored in latches 50. The new data is read out from the output terminals of D-register 46, and, if the flush through check circuitry is operating properly, X-OR match check circuitry 52 initiates a flush through check.

What is claimed is:

1. In a computer system having a main storage memory for control and data words of bits and for providing signals indicative thereof, a control register connected to receive said signals indicative of control words and to execute the same, a processing unit for performing logical operations on signals indicative of such words and two local storage units for receiving, storing and transmitting in duplicate signals indicative of such words and connected to receive such signals from said main storage memory and from said processing unit and to transmit such signals to said main storage memory and said processing unit, the combination therewith of a microdiagnostic processing system which includes:

a local file providing a stored program of signals indicative of control and data words and connected to supply said signals selectively to said control register and said local storage units, and inhibit means under the control of said control register for disabling one only of said two local storage units from receiving signals for storage, so that different sets of signals may be selectively stored in said two local storage units.

2. A system according to claim 1 wherein said one of said two local storage units is connected to supply output signals selectively to said control register whereby signals indicative of control words may be stored in said one of said local storage units and transferred to aid control register and signals indicative of results of execution of said control words may be selectively stored only in the other of said two local storage units by operating said inhibit means.

3. A system according to claim 1 which also includes means for retaining signals corresponding to a set of signals transmitted to said two local storage units for storage and comparison circuitry connected to receive said retained signals and output signals from said one of said two local storage units corresponding to said set of transmitted signals.

4. A system according to claim 1 wherein the transmission of signals from said main storage memory and processing thereof in said processing unit is on a less than full word-successive byte basis and the transmission of signals from said two local storage units is on a simultaneous full word basis.

5. A system according to claim 1 which also includes output comparison circuitry connected to said two local storage units for comparing the output signals so that, through the operation of said inhibit means, signals indicative of actual and expected results may be selectively stored in said local storage units and then compared in aid output comparison circuitry to check the accuracy of said actual result signals and noncompare signals may be stored in said two local storage units and compared in said output comparison circuitry to check the accuracy of said output comparison circuitry.

6. A system according to claim 5 wherein the transmission of signals from said main storage memory and processing thereof in said processing unit is on a less than full word successive byte basis and the transmission of signals from said two local storage units for comparison in said output comparison circuitry is on a simultaneous full word basis.

7. A system according to claim 5 which further comprises means for retaining signals corresponding to a set of signals transmitted to said two local storage units for storage and second output comparison circuitry connected to receive said retained signals and output signals from one of said two local storage units corresponding to said set of transmitted signals.

8. A system according to claim 7 wherein through the operation of said inhibit means signals other than said retained signals may be stored in said one of said local storage units and compared with said retained signals in said second output comparison circuitry to check the accuracy of said second output comparison circuitry.

9. A system according to claim 2 wherein the transmission of signals from said main storage memory and processing thereof in said processing unit is on a less than full word-successive byte basis and the transmission of said signals indicative of control words from said one of said local storage units is on a simultaneous full word basis.

* * * * *